Jan. 17, 1956  E. C. HOLTON  2,731,221
AIRCRAFT DOOR INSTALLATION
Filed June 25, 1952  3 Sheets-Sheet 1
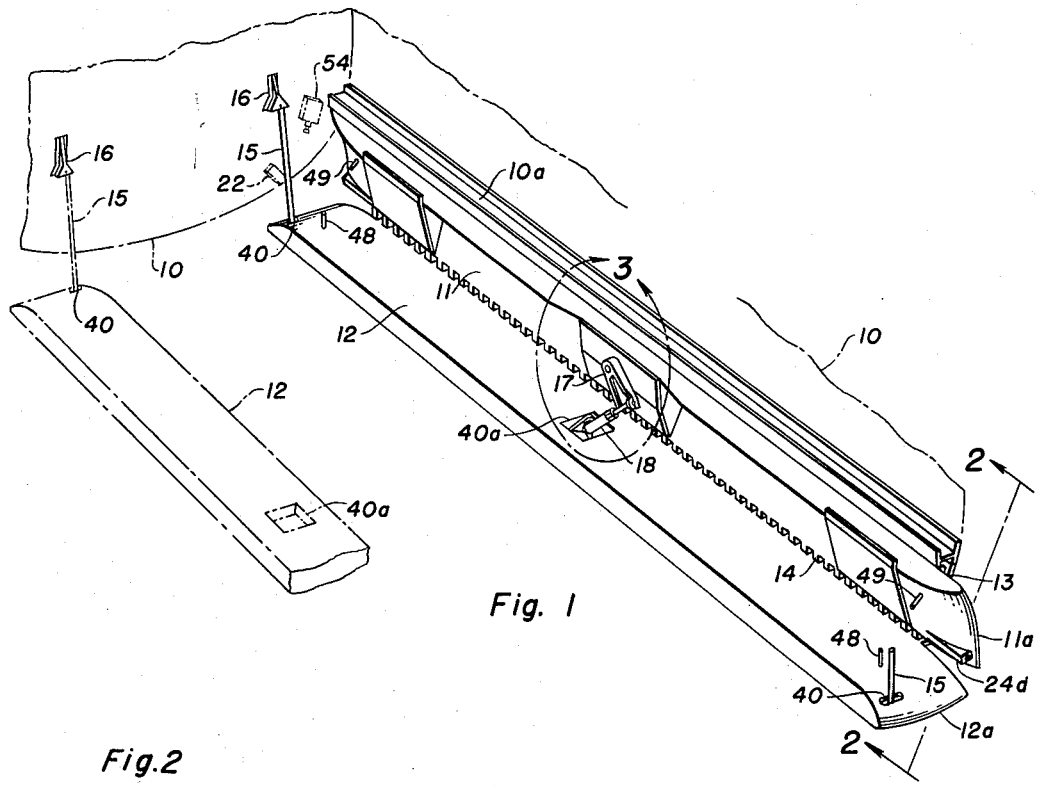
Fig. 1
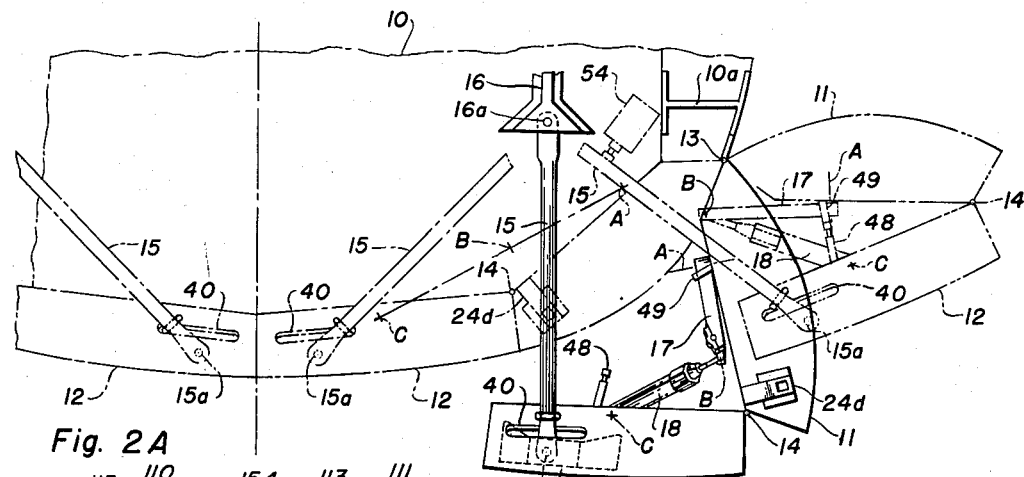
Fig. 2
Fig. 2A
Edward C. Holton
INVENTOR.
BY James M. Clark
HIS PATENT ATTORNEY.

Jan. 17, 1956   E. C. HOLTON   2,731,221
AIRCRAFT DOOR INSTALLATION
Filed June 25, 1952   3 Sheets-Sheet 2
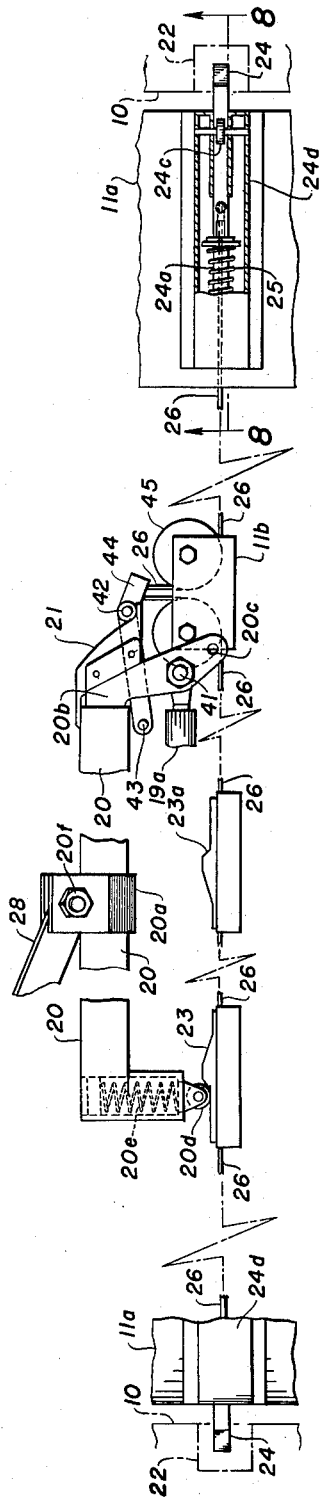
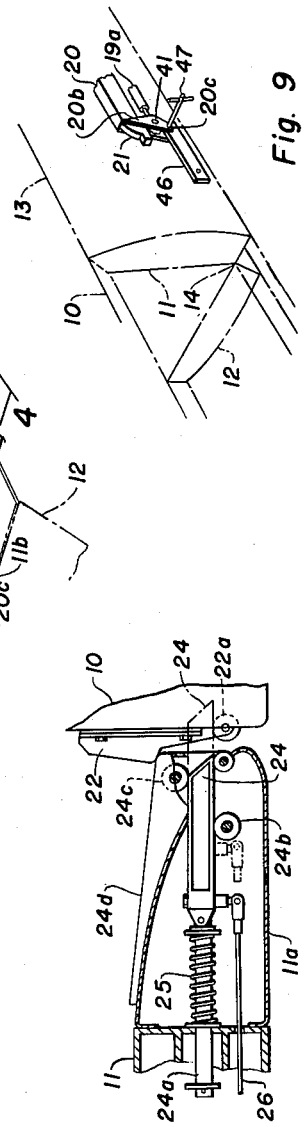
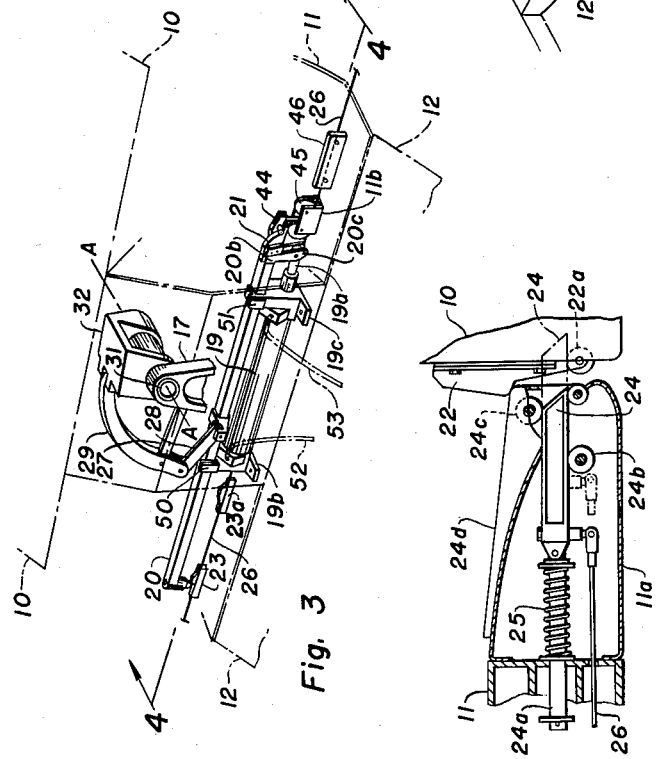
Edward C. Holton
INVENTOR.
BY
HIS PATENT ATTORNEY.

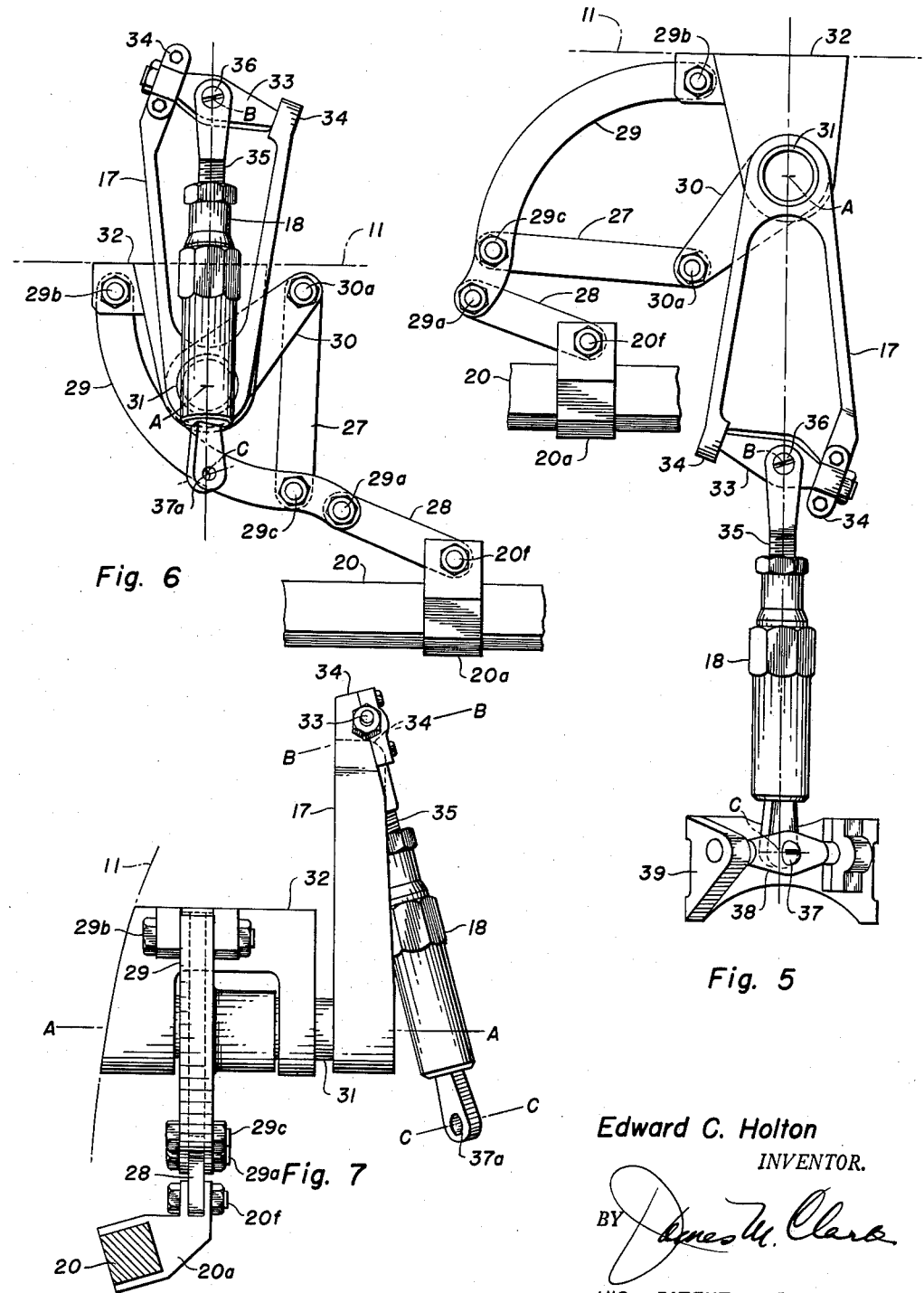

United States Patent Office 2,731,221
Patented Jan. 17, 1956

2,731,221
AIRCRAFT DOOR INSTALLATION

Edward C. Holton, Los Angeles, Calif., assignor to North American Aviation, Inc.

Application June 25, 1952, Serial No. 295,483

12 Claims. (Cl. 244—129)

The present invention relates to fairings and doors for openings in aircraft and the like and more particularly to actuating mechanisms and suspension arrangements for the same.

In modern high speed aircraft, and particularly the type from which bombs or other loads are dropped in flight, numerous problems arise in connection with the provision of properly operating doors or closures for the bomb bays or other load storage spaces within the aircraft. These problems are accentuated by the necessity of providing doors which operate in a positive and foolproof manner to provide adequate clearance for the dropping load and which doors in being moved to their opened positions cause the minimum disturbance to the flight characteristics of the aircraft. It is further desirable to provide such doors with suitable actuating mechanism which is preferably carried by the doors in close relationship thereto in order to keep space requirements to a minimum and prevent interference with the dropping load, to provide adequate access for servicing and to present a compact arrangement in both the closed and opened positions of the doors.

The present invention relates to an improved actuating and suspension arrangement for doors of the multi-panel type such as may be used as the bomb bay fairing doors for bomb-carrying aircraft or for the doors of load carrying compartments. In a preferred embodiment of the present invention, in a typical bomb bay door installation, each door is hinged along its outer edge to the aircraft fuselage and is made up of two interconnected panels longitudinally hinged together along their adjoining edges. The upper panel of each multi-panel door preferably carries the actuating mechanism and is operatively connected by means of universally interconnected levers with the lower panel of the door. This latter panel is preferably supported from the aircraft fuselage preferably at its ends by pivotally suspended links which cooperate with the actuating mechanism between the panels to both rotate the panels bodily about the longitudinal axis of the fuselage hinge, as well as to rotate or fold the panels together about the axis of the intermediate panel hinge. The improved door actuating mechanism also provides a novel door latching arrangement in which the inner panel is unlatched from the fuselage prior to imparting retracting or opening movement to the door panels. A further important feature of the present arrangement is the formation of a platform or a walkway at each side of the bomb bay to facilitate servicing of the aircraft and for maintenance operations within the bomb bay or other opening in the aircraft. It will be understood that such openings may include large wheel wells, hatches for cargo compartments and similar openings. The present improved arrangement also includes provision of a manual locking pin to positively lock the door panels in the half open or the walkway providing condition, as well as limit switches for interconnection with the bomb dropping gear. It also includes the provision of stabilizing struts to insure rigidity of the door panels in the open position to assist in preventing damaging vibrations with the open doors extended into the airstream during high speed flight conditions.

In further connection with the foregoing statement and primary objects of the invention, it might also be added that further objects reside in the provision of an improved form of multi-panel door having a novel suspension and interacting operating mechanism which may be electrically and hydraulically controlled from within the aircraft to cause the door panels to move through prescribed paths with respect to the fuselage and with respect to each other, and which panels are lockable in an intermediate position to provide the said servicing walkway. Other objects and advantages of the present invention will occur to those skilled in the art after reading the following description, taken in conjunction with the accompanying drawings, forming a part thereof, in which:

Fig. 1 is a perspective view of the panels of the improved door arrangement as locked in an intermediate position for provision of a servicing walkway;

Fig. 2 is an end elevational view of the same to a larger scale as viewed in the direction of 2—2 of Fig. 1 and additionally showing the panels in both the fully closed and fully opened positions;

Fig. 2A is an end elevational view similar to Fig. 2, but showing a modification thereof;

Fig. 3 is a perspective view of the major components of the actuating mechanism carried by the upper door panel;

Fig. 4 is an elevational view of the same to an enlarged scale as viewed along 4—4 in Fig. 3, and which includes the door latching mechanism at the ends of the panel;

Fig. 5 shows the actuating linkage in the fully closed position of the door;

Fig. 6 is a similar view of the same as the actuating arm is rotated into the fully opened condition of the door;

Fig. 7 is an end elevational view of the mechanism in the position shown in Fig. 6;

Fig. 8 is a detailed view of the panel latching mechanism; and

Fig. 9 is a perspective view of the panels in the half-open walkway-forming position showing the manner in which the panels are manually interlocked.

Referring now to Figs. 1 and 2, the numeral 10 indicates the lower central portion of the fuselage of an aircraft within which there has been provided a bomb bay or other load-carrying compartment for which only the lower side-wall portion and similar portion of one end wall has been fragmentarily indicated. At each fuselage side-wall, there is preferably a longeron or like structural member 10a from the lower outer flange of which the upper door panel 11 is supported by means of the full length piano type hinge 13. The lower door panel 12 is pivotally interconnected with the upper panel 11 by means of the similar full length piano type hinge 14. The outer face of each panel 11 and 12 is contoured to provide a streamlined alignment with the fore and aft portions of the fuselage 10 in the closed position of the two-panel door as shown in Fig. 2. The lower panel 12 is supported at each terminal by means of a swinging link or idler strut 15 which is pivotally supported at 16a from the support fitting 16 mounted upon the fuselage 10, the link 15 being pivotally connected at its lower end at 15a to the outer panel 12. It will be understood that the bomb bay is faired by a pair of symmetrically disposed doors or closures each of which is made up of the upper and lower panels 11 and 12, the doors each operating simultaneously, in unison, and the free edges of the lower panels 12 meeting and abutting at the centerline of the fuselage. However, it should be further understood that the bomb bay or other compartment opening may be faired by a single door made up of the panels 11 and 12, with the free edge of the panel 12 meeting and abutting the fuselage side wall opposite that containing the hinge 13.

Such an arrangement is shown in Fig. 2A wherein the panel 111 is supported from the fuselage 110 by means of a full length piano-type hinge 113 and the adjacent panel 112 is pivotally interconnected with the panel 111 by means of a similar hinge 114. The outer panel 112 is supported at each terminal by means of a swinging link or idler strut 115 which is pivotally supported at its first terminal at 116a from a support fitting mounted upon the fuselage 110 and the strut 115 is pivotally connected at its other terminal at 115a to the panel 112.

As indicated above, the actuating mechanism is preferably supported from and housed to a great extent within the mid-portion of the upper panel 11. The actuator arm 17 and the adjustable link assembly 18, to which it is universally connected, are shown at the mid-portion of the panel in Fig. 1. As shown in Figs. 3 and 4, a single double-acting hydraulic cylinder 19, provided with a piston element 19a, provides the hydraulic power to operate each pair of doors comprising the upper panel 11 and the lower panel 12. The cylinder 19 is fixed and supported upon the upper panel 11 by the fittings 19b and 19c and the piston 19a is attached to an actuator tube 20 which is guidingly mounted within the top portions of the fittings 19b and 19c for longitudinal movement length-wise of the panel 11 and parallel to the axis of the cylinder 19. The piston 19a of the cylinder 19 is connected to the actuator tube 20 at its terminal bracket fitting 20b by means of the pin connection 41. The actuating cylinder 19 is provided with suitable flexible fluid lines 52 and 53 as shown in Fig. 3, connected to a suitable pressure source with proper valve means for the controlled retraction and extension of the piston 19a which when extended causes the actuator tube 20 to be moved therewith in the same direction.

The upper panel 11 is provided with end fairing pieces 11a at each end and the lower panel 12 is similarly provided with end fairing pieces 12a, these end portions being so shaped as to reduce the frontal area exposed to the airstream to thereby reduce the drag of the opened doors, as well as to assist in stabilizing the doors during flight. These formed end fairing pieces 11a, as more particularly shown in Fig. 8, are secured to the ends of the panel structure 11 and are provided with reciprocally mounted latching bolts 24 which when extended engage apertures in the fittings 22 provided with the pivoted rollers 22a in the end walls of the bomb bay structure within the fuselage 10. The terminal of the actuator tube 20 is provided with a cam fitting 21, as shown in Figs. 3 and 4, and upon extension of the piston 19a and concurrent movement of the tube 20 the cam 21 causes lifting engagement with the roller 42 on the lever arm 44 pivotally mounted upon the airplane structure at 43 to thereby lift the cables 26 engaged within the sheaves 45, which in turn are pivotally mounted upon the bracket fittings 11b supported upon the panel structure. Such movement of the tube 20 and lifting of the cables 26 causes retraction of the latching bolts 24 at each end of the panel 11 and disengagement of the panel from the fittings 22 in the bomb bay end walls of the fuselage. Within the run of the cable 26 there is provided the cam detents 23 and 23a which cooperate with the opposite ends of the actuator tube 20 on which a pivotally mounted cam engaging roller 20d is spring-pressed by the resilient means 20e housed within the end portion of the actuator tube 20.

The detent cam 23 is shown in Figs. 3 and 4 in the 'doors closed' position and assists in preventing inadvertent displacement of the locking mechanism due to air loads or vibration. The detent cam 23a is provided for the 'doors open' position and tends to prevent inadvertent extension of the latching bolts when the doors are in the opened position. As shown in Fig. 8, the latching bolts 24 are urged into the extended position by the compression spring 25 encircling the rod element 24a which is guided within the panel structure, and the bolt is guided between the rollers 24b and 24c. As indicated above, when the doors are closed the locking pins 24 at each end of the panel engage the fittings 22 and the doors are unlocked by the initial movement of the hydraulic cylinder 19 as imparted to its piston 19a as the actuator tube 20 slides in the same direction, relatively little movement of the remaining parts of the mechanism taking place until after the doors are unlatched.

The door actuating linkage is shown in detail in Figs. 5, 6 and 7, and provides an over-center mechanism which is self-locking in the fully opened position. Fig. 5 shows the actuating linkage in the extended position in which the door panels are also extended or unfolded into the fully closed position. The actuator tube 20 has fixed thereto a bracket 20a which is pivotally connected to the lower link 28 by the pivot 20f. The opposite terminal of the link 28 is pivotally connected at 29a to the arcuate multiplier arm 29 which in turn is pivotally connected at its opposite terminal by means of its pivot 29b to the supporting fitting 32 which is fixed to the panel structure 11. Within the support fitting 32 there is journaled the short torque tube 31 to which is fixed the above-mentioned actuator arm 17 as well as the short secondary lever arm 30. The outer terminal of the lever 30 is pivotally connected by the pivot 30a to one terminal of a further or upper link 27 which has its opposite terminal pivotally connected at 29c to an intermediate portion of the arcuate multiplier arm 29, spaced from its terminal pivot 29a. The outer or free end of the actuator arm 17 is bifurcated to provide the spaced pivot receiving portions 34, within which is pivotally mounted the upper pivot bar 33 to which the adjustable link portion 35 of the adjustable link 18 is pivotally connected as by the attachment pivot screw 36. The lower terminal of the adjustable link assembly 18 is similarly universally connected to the lower pivot bar 38 as by the pivot screw 37, engaging the hole 37a, the ends of the pivot bar 38 being journaled for rotation within the spaced apertured portions of the bifurcated fitting 39 fixedly attached to the panel structure 12 and accessible through the opening 40a in the surface thereof. To facilitate explaining the geometry of the actuating linkage and the manner in which it positions the inter-hinged door panels the axis of the torque shaft 31 has been designated A—A, the intersection of the axes of the pivot bar 33 and the pin 36 as point B, and the similar intersection of the pivot bar 38 and the pivot 37 as point C. In Fig. 5, in which the door panels are in the closed position, the point A on the axis A—A and the points B and C all lie in the same general transverse vertical plane, this relationship of the actuating linkage being indicated diagrammatically by the construction lines in Fig. 2 in the closed position of the door panels. This relationship is also indicated diagrammatically by the construction lines having points AA, BB, and CC in Fig. 2A.

When actuation of the hydraulic cylinder 19 is initiated by extension of its piston 19a and concurrent movement of the actuator tube 20, the unlatching mechanism is initially actuated and the latching bolts 24 are retracted to permit opening of the door. After this has been accomplished, further movement of the tube 20 toward the right in Fig. 5 is transmitted through the lower link 28 which in turn imparts counterclockwise rotation to the arcuate link 29, which may be referred to in its function as a multiplier arm, about its pivot 29b and similar counterclockwise rotation is imparted, through the upper link 27 and the lever arm 30, to the torque tube 31. Continued rotation of the torque tube 31 through an approximate angle as indicated in Fig. 1, causes the point C to be drawn closer to the point A on the axis A—A due to the hinged relationship between the panels 11 and 12. Normally, as the point C would be drawn toward the axis A—A the lower panel 12 would tend to be lifted upwardly but due to the effect of the idler link 15 the upward component imparted to the panel 12 is translated into an outward lateral and downward component, as established by the fixed length of the swinging idler links 15, and the panels are caused to assume the full line position in Fig. 2, in which the upper panel is tilted outwardly slightly beyond the vertical about its hinge 13 to the fixed fuselage structure, as the lower panel 12 has been moved laterally outwardly slightly beyond its horizontal position.

The panels 11 and 12 may be manually locked in this intermediate position by insertion of the pin 47 as shown in Fig. 9, through the openings 20c at the lower extremity of the bracket fitting 20b at the end of the actuator tube 20, the pin 47 also passing through properly located apertures in the locking plate 46 fixedly attached to the panel structure 11. It will, accordingly, be seen that the mechanical action of drawing the lower panel 12 toward the upper panel 11 in combination with the forces developed by the idler struts 15 at both ends of the panel 12 and the influence of the hinges 13 and 14, forces the panels outwardly toward the fully opened position. When the doors are locked in the intermediate position as shown in the full lines in Fig. 2, as well as in Fig. 9, they may be utilized as walkways during servicing of the aircraft and particularly the equipment within the bomb bay of the fuselage, as well as in other and similar maintenance operations.

The bomb bay doors are preferably controlled electrically and as indicated above are actuated hydraulically. The doors are preferably completely interchangeable, i. e., the set of doors shown on the far side of the fuselage in Fig. 1, may be installed on the opposite side of the fuselage without alteration, and vice versa. In addition to locking the bomb bay doors in the half opened position as described above, they may also be manually locked in the fully opened position to facilitate ground servicing and for personnel protection merely by inserting the manual locking pin 47 at a more advanced position of the actuator tube 20 along the locking plate 46. These lock points are preferably located along the longitudinal center of the upper portion of each bomb door panel 11 (where they may be identified by two round cover plates on the exterior skin of the fuselage) and the lock pin 47 which may be stowed within the panel adjacent the locking points, when inserted in the fitting 20b locks the actuator tube 20 against movement in either direction. In the fully opened condition of the door, when the panels are folded together, as shown in Fig. 2, the stabilizer stops 48 and 49 become aligned and engage each other to prevent undue relative movement and vibration of the panels.

The control of the electrical and hydraulic actuating mechanism for the doors may be accomplished by available and well known equipment which does not form a novel feature of the present invention and for that reason has not been further disclosed in greater detail. It might be stated for a general understanding of the application of the present invention, however, that the operation of the bomb bay doors in flight may be accomplished by electrically energizing a selector valve which ports hydraulic fluid through the flexible connection 52 to the bomb door actuating cylinder 19 and also by electrically energizing the compressor transfer valve. A flow regulator of approximately 5 gallons per minute is preferably installed on the return side of the closed sequence in order to restrict the flow of liquid and to aid in controlling the speed of travel of the bomb bay door panels to the closed position, whereas pressure to the open side is preferably unrestricted. The bomb bay door opening time may preferably be approximately one and one-half seconds and the closing time may be approximately two and one-half seconds, but of course can be varied widely to suit conditions. Limit switches 50 and 51 at each extreme position of the hydraulic cylinder 19 de-energize both the control valve and the cabin compressor transfer valve when the action is complete. Normal operation of the bomb bay doors is accomplished by using the normal or utility pressure section of the aircraft hydraulic system, and during ground operations, the bomb bay doors may be operated through the use of an emergency bomb door valve. When using this valve, the operator is in a better position to observe whether the bomb bay doors can be safely operated and operation is accomplished when the bomb door valve on an emergency hydraulic panel is moved to the open position. This movement, besides directing fluid, also positions a microswitch 54 to start the emergency hydraulic pump, which switch is also actuated by the idler strut 15 to stop the pump when the bomb bay doors reach the full open position; the microswitch 154 of Fig. 2A being similarly actuated by the idler strut 115.

Other forms and modifications of the present invention, both with respect to its general arrangement and the details of its several parts, which may become obvious to those skilled in the art after reading the foregoing description, are intended to come within the scope and spirit of this invention, as more particularly set forth in the appended claims.

I claim:

1. In an aircraft, a fuselage having an opening therein, a first door panel hinged to said fuselage at a lateral edge of said opening, a second door panel hinged to the free edge of said first door panel, a link pivotally mounted upon said fuselage and pivotally connected to said second door panel, actuating means carried by said first door panel and pivotally connected to said second panel for moving both said panels in cooperation with said link between open and closed positions, and means associated with said actuating means and said first door panel for locking both said panels at an intermediate position in which one of said panels serves as a walkway for providing access to said fuselage opening.

2. In an aircraft, a fuselage having an opening therein, a first door panel hinged to said fuselage at a lateral edge of said opening, a second door panel hinged to the free edge of said first door panel, a link pivotally suspended from said fuselage and pivotally connected to said second door panel, actuating means including a hydraulic-operated linkage carried entirely by said door panels for moving said panels in cooperation with said suspended link between open and closed positions, means for automatically latching said panels in the closed position and means associated with said actuating means and said first door panel for locking said panels at an intermediate position in which the inner face of said second panel is disposed substantially horizontally and serves as a walkway for providing access to said fuselage opening.

3. In an aircraft door arrangement including a fuselage having an opening therein, a first door panel hinged to said fuselage at a lateral edge of said opening, and a second door panel hinged to the free edge of said first door panel, a link pivotally suspended from said fuselage and pivotally connected to said second door panel, actuating means including a fluid-actuated elongated member guided for rectilinear movement and operatively connected to a pivotally mounted actuator arm for imparting rotary movement thereto, said member and said arm both carried by one of said door panels, and link means universally connecting the other of said door panels with the free end of said actuator arm for moving said panels in cooperation with said suspended link between open and closed positions.

4. In an aircraft door arrangement, including a fuselage having an opening therein, a first door panel hinged to said fuselage at a lateral edge of said opening, and a second door panel hinged to the free edge of said first door panel, a link pivotally suspended from said fuselage and pivotally connected to said second door panel, actuating means including a fluid-actuated elongated member guided for rectilinear movement and operatively connected to a pivotally mounted actuator arm for imparting rotary movement thereto, said member and said arm both carried by one of said door panels, link means universally connecting the other of said door panels with the free end of said actuator arm for moving said panels in cooperation with said suspended link between open and closed positions, and means associated with said actuating means for locking said panels at an intermediate position in which said second panel serves as a walkway for providing access to said fuselage opening.

5. In an aircraft door arrangement including a fuselage having an opening therein, a first door panel hinged to said fuselage at a lateral edge of said opening, and a second door panel hinged to the free edge of said first door panel, a link pivotally suspended from said fuselage and pivotally connected to said second door panel, latching means for fixing said panels to said fuselage, actuating means including a fluid-actuated elongated member guided for rectilinear movement and operatively connected to a pivotally mounted actuator arm for imparting rotary movement thereto, said member and said arm both carried by one of said door panels, link means universally connecting the other of said door panels with the free end of said actuator arm for moving said panels in cooperation with said suspended link between open and closed positions, means associated with said actuating means for automatically unlatching said panels from said fuselage prior to opening of said panels, and means associated with said actuating means for manually locking said panels at an intermediate position in which the inner face of said second panel is horizontally disposed and serves as a walkway for providing access to said fuselage opening.

6. In an aircraft having an opening in a fuselage, a hinged multi-panel door hinged to the fuselage along one edge of said opening, link means pivotally connected to one of said door panels and mounted upon a fixed pivot carried by said fuselage, and actuating linkage pivotally mounted upon another of said door panels and pivotally connected with said first mentioned panel, said link means arranged to suspend the door in such manner that folding and unfolding of said door panels by said actuating linkage in cooperation with said link means opens and closes said door with respect to said fuselage opening.

7. In an aircraft having an opening in a fuselage, a hinged multi-panel door hinged to the fuselage along one edge of said opening, a link having one end pivotally mounted upon said fuselage and having its other end pivotally connected to one of said door panels to thereby pivotally suspend said panel, actuating linkage pivotally mounted upon a further of said door panels and pivotally connected to said suspended panel, the folding and unfolding of said door panels by said actuating linkage in cooperation with said link causing the opening and closing of said door with respect to said fuselage opening.

8. In an aircraft, a fuselage having an opening therein, a first door panel hinged to said fuselage along one edge of said opening, a second door panel hinged to the free edge of said first door panel, link means pivotally connected to said second door panel and mounted upon a fixed pivot carried by said fuselage, actuating linkage carried by one of said door panels and pivotally interconnected with the other of said door panels for folding said panels, the folding action in cooperation with the action of the said link means causing the opening of said door with respect to said fuselage opening.

9. In an aircraft having an opening in a fuselage thereof, a door hingedly mounted along one edge of said opening, said door having panels hinged one to another, a link pivotally suspended from said fuselage and pivotally connected to a first of said panels, actuating means including a reciprocable member guided for rectilinear movement and operatively connected to a pivotally mounted actuator arm, said actuating means and said actuator arm both carried by one of said panels, and linkage means universally connecting another of said panels with said actuator arm for moving said panels in cooperation with said link between open and closed positions.

10. In an aircraft, a fuselage having an opening therein, a door for said opening having two panels hinged to each other, link means pivotally connected to one of said door panels and mounted upon a fixed pivot carried by said fuselage, the other said door panel hinged to the edge of said opening, and power actuated means carried by the other said door panel pivotally interlinked with said first mentioned panel, said link means arranged in such manner that folding of said door panels by said power actuated means in cooperation with said link means opens said door with respect to said fuselage opening.

11. In an aircraft, a fuselage having an opening therein, a hinged multi-panel door hinged to the fuselage at a lateral edge of said opening, link means pivotally connected to one of said door panels and mounted upon a fixed pivot carried by said fuselage, and power means carried by a further of said door panels pivotally interlinked with said first mentioned panel, said link means arranged in such manner that folding and unfolding of said door panels by said power means in cooperation with said link means opens and closes said door with respect to said fuselage opening.

12. In an aircraft, a fuselage having an opening therein, a two-panel door hinged to the fuselage at a lateral edge of said opening, said door panels hinged to each other, link means pivotally connected to one of said door panels and mounted upon a fixed pivot carried by said fuselage, actuating means including a hydraulic cylinder carried by the other of said door panels, and actuating linkage pivotally connecting said first mentioned panel with said hydraulic cylinder, said link means arranged in such manner that folding and unfolding of said door panels by said actuating means in cooperation with said link means opens and closes said door with respect to said fuselage opening.

References Cited in the file of this patent

UNITED STATES PATENTS

| 423,189 | Steuerwald et al. | Mar. 11, 1890 |
| 474,353 | Bailey | May 10, 1892 |
| 1,866,299 | Ericson | July 5, 1932 |
| 2,196,546 | Bowers | Apr. 9, 1940 |
| 2,322,372 | Levy | June 22, 1943 |
| 2,362,361 | Davis | Nov. 7, 1944 |
| 2,457,625 | Amiot | Dec. 28, 1948 |

FOREIGN PATENTS

| 641,987 | Great Britain | Aug. 23, 1950 |